United States Patent
Dam et al.

(10) Patent No.: US 6,385,457 B1
(45) Date of Patent: May 7, 2002

(54) METHOD AND ARRANGEMENT RELATING TO RADIO COMMUNICATIONS SYSTEMS

(75) Inventors: Henrik Dam, Liljeholmen (SE); Jonas Karlsson, Yokohama (JP)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/109,060

(22) Filed: Jul. 2, 1998

(30) Foreign Application Priority Data

Jul. 4, 1997 (SE) .............................................. 9702597

(51) Int. Cl.[7] .................................................. H04Q 7/20
(52) U.S. Cl. ........................ 455/456; 455/561; 455/562; 455/436; 455/450
(58) Field of Search ................................. 455/561, 562, 455/277.1, 277.2, 456, 457, 450, 436, 12.1, 13.1; 342/371, 373, 374

(56) References Cited

U.S. PATENT DOCUMENTS

| | | | | |
|---|---|---|---|---|
| 5,512,908 A | * | 4/1996 | Herrick | 342/387 |
| 5,515,378 A | | 5/1996 | Roy, III et al. | |
| 5,603,082 A | * | 2/1997 | Hamabe | 455/33.1 |
| 5,615,409 A | | 3/1997 | Forssén et al. | |
| 5,706,014 A | * | 1/1998 | Abbasi | 342/357.1 |
| 5,754,138 A | * | 5/1998 | Turcotte et al. | 342/373 |
| 5,890,068 A | * | 3/1999 | Fattouche et al. | 455/456 |
| 6,026,304 A | * | 2/2000 | Hilsenrath et al. | 455/456 |
| 6,075,484 A | * | 6/2000 | Daniel et al. | 342/372 |

FOREIGN PATENT DOCUMENTS

| | | |
|---|---|---|
| EP | 0647981 A2 | 4/1995 |
| WO | 95/22873 | 8/1995 |
| WO | WO95/22873 | 8/1995 |
| WO | 96/00484 | 1/1996 |
| WO | WO96/00484 | 1/1996 |
| WO | WO96/22662 | 7/1996 |
| WO | 96/22662 | 7/1996 |
| WO | WO96/23329 | 8/1996 |
| WO | 96/23329 | 8/1996 |
| WO | WO96/37970 | 11/1996 |
| WO | 96/37970 | 11/1996 |
| WO | 96/38015 | 11/1996 |
| WO | WO96/38015 | 11/1996 |

OTHER PUBLICATIONS

Jon Eriksson et al., "Plausibility of Assuming Ideal Arrays for Direction of Arrival Estimation," IEEE Antennas and Propogation Society International Symposium, vol. Two, pp. 1364–1367, 1996 Digest.

Apostolas Paparhanassiou et al., "Multi–User Direction of Arrival and Channel Estimation for Time–Slotted CDMA with Joint Defection," 13th International Conference on Digital Signal Processing, IEEE, pp. 375–378, 1997.

IEEE Antennas and Propagation Society International . . . , vol. 2, Jul. 1996, Eriksson J. et al., "Plausibility of assuming ideal arrays for direction of arrival estimation", p. 1364—p. 1367.

Proceedings of 13th International Conference on Digital . . . , vol. Jul. 1997, Papathanassiou A. et al., "Multi–User Direction of Arrival and Channel Estimation for Time–Slotted CDMA with Joint Detection", p. 375—p. 378.

* cited by examiner

*Primary Examiner*—Dwayne Bost
*Assistant Examiner*—Temica M. Davis
(74) *Attorney, Agent, or Firm*—Burns, Doane, Swecker & Mathis, L.L.P.

(57) ABSTRACT

A radio communications system includes a radio base station provided with an array antenna. The antenna lobes of the array antenna can be directed onto a terminal with the aid of a generated directional estimate. The directional estimate is based on a signal received from the terminal. A method registers a generated directional estimate together with a terminal recognition character. The directional estimate is read when the radio connection with the terminal changes channel. The antenna lobe is directed on the basis of the direction estimate, immediately communication commences over the new channel. A radio base station is equipped with a database in which the terminal recognition character and the direction estimate are registered.

19 Claims, 6 Drawing Sheets

METHOD AND ARRANGEMENT RELATING TO RADIO COMMUNICATIONS SYSTEMS

FIELD OF INVENTION

The present invention relates to a radio base station and to a method pertaining to a radio communications system in which the radio base stations are equipped with antenna arrays whose antenna lobes can be aimed in desired directions. Such antennas can be used in the known GSM system, for instance.

BACKGROUND ART

The use of adaptive antennas, also called antenna arrays, that can be controlled to aim the antenna lobes in desired directions is well known to the art. It is also well known to make a directional estimate of the direction-of-arrival of a received signal and to control the antenna array on the basis of this estimate. This has long been the practice in military radio communications systems, to enhance the interference tolerance of the system. The use of antenna arrays in civilian radio communications systems, and then in mobile communications systems in particular, has attracted much attention in recent years. In mobile communications systems, the radio frequency must be used extremely effectively, in order to satisfy capacity and quality requirements.

A radio base station of a mobile communications system serves mobile stations located in the cell of the base station with radio communication. The radio base station has access to a plurality of radio channels to this end. The radio channels are also used in another cell at a distance from the first cell given by the frequency reuse factor. When these connections are setup over the same radio channel, interference will occur between radio connections setup in the first cell and those setup in the second cell. The minimum frequency reuse factor is determined by the maximum permitted interference. A small frequency reuse factor enables effective use of the frequency spectra.

The use of adaptive antennas in radio base stations enables interference between different radio connections to be reduced, and therewith provides a potential for reducing the frequency reuse factor while maintaining the quality of the radio connection.

Patent Application WO 96/22662 discloses a radio communications system in which the radio base stations are equipped with antenna arrays and means for making a directional estimate of a received signal. WO 96/22662 addresses the problem of establishing communication in a cell with several terminals over one and the same radio channel. Radio connection with each of these terminals can be selected with the aid of spatial information, i.e. a directional estimate for each terminal. Spatial separation, however, requires the terminals that use the same radio channel to be spatially scattered, i.e. to be located in different directions from the radio base station. When a new connection is to be setup with a terminal, a radio channel is allocated for the connection. The allocated radio channel may not be used by another terminal in the same direction. In order to make allocation of a suitable radio channel possible, the radio base station is equipped with a database that includes a list of all available radio channels in the radio base station and for each of the radio channels a directional estimate for each of the mobile stations that uses the radio channel.

The problem addressed by WO 96/22622 is different than the problem addressed by the present invention, namely the use of only one radio channel for communication with several radio terminals that are served by one and the same radio base station. The solution proposed in WO 96/22662 also assumes that the radio base station knows the identity of a mobile station that uses a given channel.

DISCLOSURE OF THE INVENTION

The present invention addresses the problem of needing to make a new estimate of the direction to the mobile station each time a radio connection with a mobile station is switched to a new radio channel, before the antenna lobe can be aimed towards the mobile station. This means that when beginning to use the new radio channel, the signal-disturbance ratio is considerably poorer than if it were possible to aim the antenna lobe immediately in an advantageous manner.

When setting-up a new traffic connection, the signalling messages are sent over different radio channels. These messages require good connection quality, in order for the connections to be setup quickly and correctly. Furthermore, signalling will preferably seize signalling channels over a short time period, in order for the signalling channel to have a good capacity.

A change of radio channel for an existing connection can also be made if the radio quality of the first channel is poor. If this new channel does not immediately improve the quality of the radio transmission, due to the absence of a directional estimate, there is a risk that the connection will be broken.

In the case of radio communications systems, such as the known GSM system, in which a radio base station solely puts through signalling information from the mobile network to the mobile station, and vice versa, a further problem is one of being able to use the directional estimate in a channel change without needing to change the interface between the radio base station and the mobile network.

Accordingly, in respect of a radio communications system whose radio base stations are equipped with directional antenna lobes, an object of the present invention is to enable the antenna lobe to be directed in respect of a radio channel immediately a radio connection is moved to this channel.

This problem is solved in accordance with the invention with a method in which an estimate of the direction of the mobile station is generated when the connection takes place over a first physical radio channel. A mobile station recognition character is also identified when the connection is setup over the first radio channel. The recognition character and the directional estimate derived from the recognition character are registered in a list. When a command relating to channel activity is received via the fixed connection of the radio base station, a recognition character for the mobile station for which the new physical radio channel shall be used is also identified. The list is read when the allocated channel is activated, and the directional estimate is found on the basis of the mobile station recognition character. This directional estimate is used to direct the antenna lobe in an appropriate direction, immediately use of the new channel is commenced.

The present invention also relates to a radio base station that includes means for carrying out the aforesaid method. The radio base station is typically equipped with at least one, normally several, transceiver units. Each of these transceiver units handles a radio carrier-wave, which in TDMA systems is divided into a number of physical radio channels. Transceiver units convert in uplink a physical radio connection to a bit stream that is forwarded to the radio network over a fixed connection, and vice versa in downlink. In accordance with the invention, these known transceiver units are provided with means for reading certain of the signalling messages that are exchanged between the mobile station and the radio network and therewith identify the mobile station recognition character and detect messages to the effect that the connection has been switched to a new radio channel. The radio base station also includes a database having connections to each transceiver unit in said station. A transceiver unit registers in the database directional estimates for a mobile station with respect to an identified mobile station recognition character and possibly a new channel connection when such a connection is identified. The transceiver unit includes means for finding such a directional estimate in the database, provided that this directional estimate and the new channel have been registered. The transceiver unit then uses the directional estimate to shape the antenna lobe in a beneficial fashion.

When a radio connection is moved to a new radio channel, the invention has the advantage of enabling an antenna lobe belonging to the new channel to be shaped immediately in an appropriate direction. This improves the transmission quality of important signalling that is transmitted immediately after the change of channel.

Because the antenna lobe is shaped advantageously from the very beginning, interference on other radio traffic is also reduced.

The invention also has the advantage of enabling the directional estimate to be generated when communication takes place over a beacon channel. The frequency reuse factor in respect of a beacon channel is greater than in the case of standard traffic channels, so that interference will be lower in respect of the important signalling that takes place in the beacon channel. This enables a channel estimate of better quality to be made in a beacon channel than in a standard traffic channel.

The invention will now be described in more detail with reference to preferred embodiments thereof and also with reference to the accompanying drawings.

BRIEF DESCRIPTION OF THE DRAWINGS

FIG. 4b is a continuation of the method illustrated in FIG. 4a.

DETAILED DESCRIPTION OF PREFERRED EMBODIMENTS

The present invention enables a radio base station to utilize an earlier established directional estimate that relates to a given terminal when the terminal is later switched to another radio channel. Accordingly, the radio base station identifies a terminal recognition character and the directional estimate and registers the same in a list. In the event of a channel change, the directional estimate is then retrieved from the list and used in conjunction with radio transmission in the new channel. For instance, according to the invention, the directional estimate is reused in setting-up a call connection when the terminal hands over from a control channel to a speech channel or in the event of intracell handover between two traffic channels.

Figure 1:
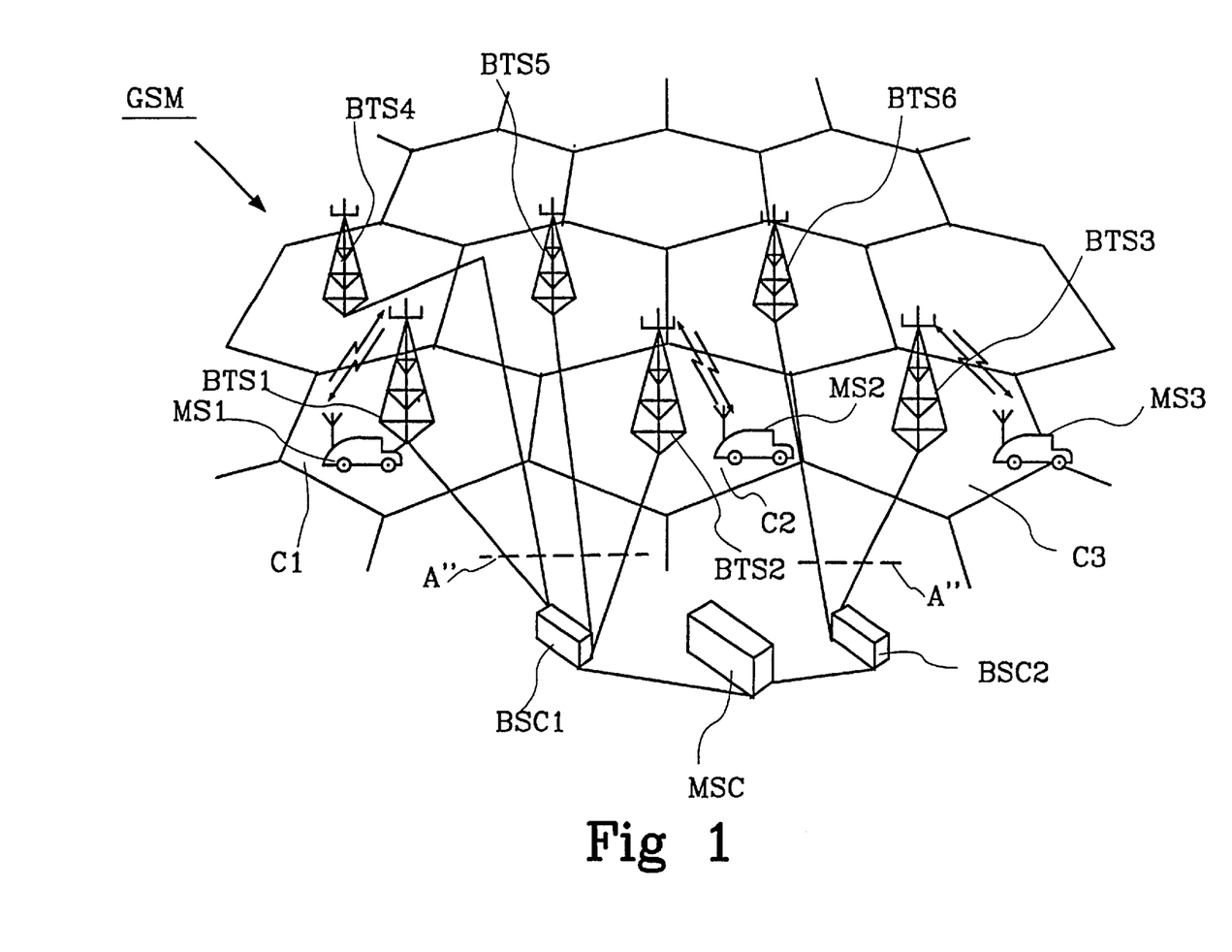
FIG. 1 illustrates the GSM system.

The invention will be described hereinafter with a starting point from the well known and standardized GSM system. Parts of the GSM system are described by way of introduction, to facilitate an understanding of the invention. FIG. 1 is an illustration of the GSM system. The system includes at least one mobile switching center MSC to which a plurality of base station controllers BSC1–BSC2 are connected. A plurality of radio base stations BTS1–BTS6 are also connected to a base station controller BSC1–BSC2.

The mobile switching center MSC and the base station controllers BSC1–BSC2 form a communications network with branches to the radio base stations BTS1–BTS6.

A collection can be setup via a radio base station BTS1–BTS6 with those mobile stations MS1–MS3 that are located within a geographical area served by said radio base station, as evident from FIG. 1. Thus, the radio base station BTS1 can serve mobile stations within the cell C1, the mobile station MS1 in FIG. 1, while the radio base station BTS2 is able to serve the mobile station MS2.

The interface between a mobile station MS1–MS3 and a radio base station BTS1–BTS6, and the interface A" of the fixed connection between a radio base station BTS1–BTS6 and a base station controller BSC1–BSC2. are of interest with respect to the present invention This latter interface is designated the Abis interface.

With regard to the radio interface, a radio frequency channel is divided into a number of time slots in the manner characteristic of a TDMA system. Eight time slots constitute a TDMA frame numbered from zero to seven. A physical radio channel is comprised of a radio frequency channel and one of these time slots which is repeated cyclically in time. The physical channel consists of an uplink connection and a downlink connection with a fixed frequency reuse factor therebetween.

The physical radio channels transmit logical channels. These logical channels transmit different types of information. The logical channels are divided into different groups of channels, depending on the information transmitted.

The CCCH channels are a group of common control channels used in conjunction with an access request and in conjunction with channel allocation. The GSM system includes two different CCCH channels in downlink. The paging channel is used to send a paging message to an addressed mobile station when the mobile network wishes to make contact with this station. The allocation channel or AGCH channel (Access Grant Channel) is a downlink channel that transmits channel allocation messages to an addressed mobile station. Mobile stations that have recently requested access listen to this channel with the intention of detecting a channel allocation message, or access grant message, intended for the own mobile station.

Only one type of CCCH channel, the access channel or the RACH channel (Random Access Channel) is found in the uplink of a GSM system. The access channel is available to all mobile stations for sending an access request to the mobile network. The access channel is used by the mobile station to request access to a radio connection, either on the initiative of the mobile station or on the initiative of the network and a paging message reaches the mobile station over the PCH channel.

Another group of channels are the dedicated channels that are allocated to a connection to a designated mobile station. This channel group includes three dedicated control channels and a user-data transmitting traffic channel. The traffic channel is the important channel, insomuch as it is this channel that transmits information between users, and information whereby the traffic channel can be maintained is transmitted on remaining channels.

One of the dedicated control channels is the stand-alone dedicated control channel, SDCCH. The SDCCH channel is used by a new traffic connection during the connection setup procedure. During this connection setup procedure, there is allocated a new physical channel on which the remaining two dedicated control channels and the logical traffic channel are transmitted. Accordingly, this dedicated physical channel is referred to hereinafter as the physical traffic channel. A physical traffic channel consists of an uplink and a downlink connection.

The downlink also includes a group of logical broadcast channels BCH, on which all mobile stations listen. The BCH channels include two channels that are used to synchronize the mobile station and the BCCH channel. The BCCH channel constitutes a logical broadcasting channel and broadcasts cell information to which all peripheral mobile stations MS1–MS3 listen.

A radio base station BTS1–BTS6 has at least one frequency channel, normally several frequency channels, allocated for radio communication. One of these allocated frequency channels is a beacon channel. The beacon channel is given its name because it carries the logical beacon channel group. The common control channels and, normally, also the SDCCH channel are transmitted in the beacon channel. By beacon channel is meant in the following that frequency channel which carries the logical beacon channels, among other things. Remaining frequency channels in the radio base station BTS1–BTS6 solely carry dedicated physical channels, normally traffic channels.

Figure 2A:
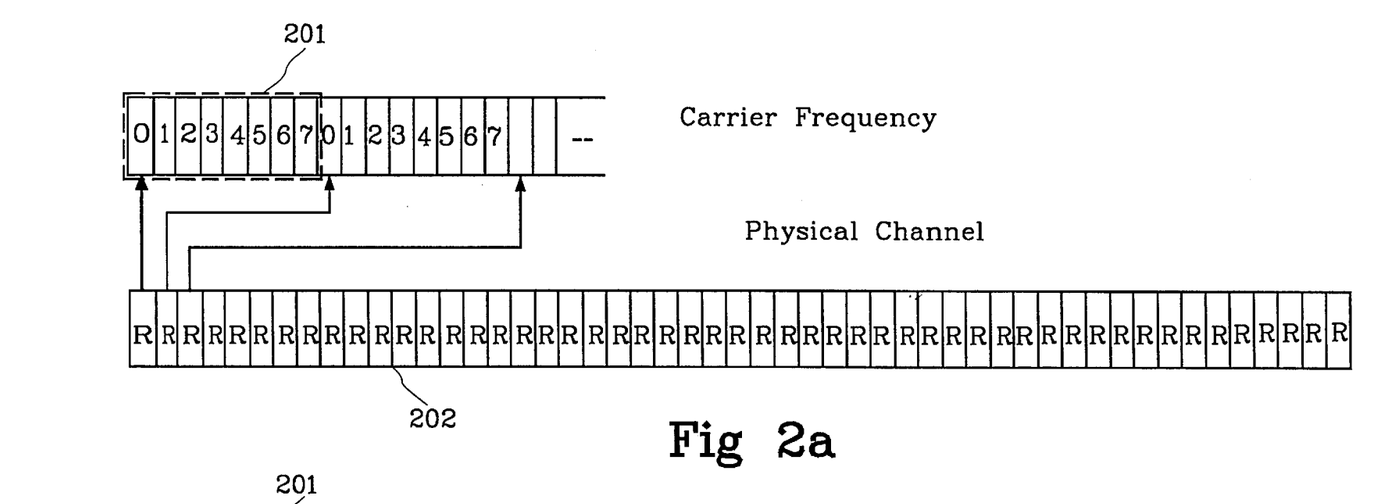
FIG. 2a is a mapping diagram of the physical uplink control channel and a logical channel in a GSM system.

FIG. 2a illustrates a frequency channel in uplink and shows how the channel is divided into time slots. FIG. 2a also shows a TDMA frame 201, which consists of eight mutually sequential time slots in the frequency channel. The time slots in the TDMA frame 201 are numbered from zero to seven. FIG. 2a also shows a physical channel 202. The physical channel 202 is comprised of a given time slot that is repeated in each TDMA frame. The physical channel contains a sequence of fifty-one time slots from which there is formed a multi-frame for the CCCH channels and the BCH channels. The procedure used to transmit the logical channels on physical channels is called mapping. The access channel, referenced R, is mapped in each time slot in the multiframe and thus has sole access to the physical channel 202. A multiframe 202 is repeated cyclically.

Figure 2B:
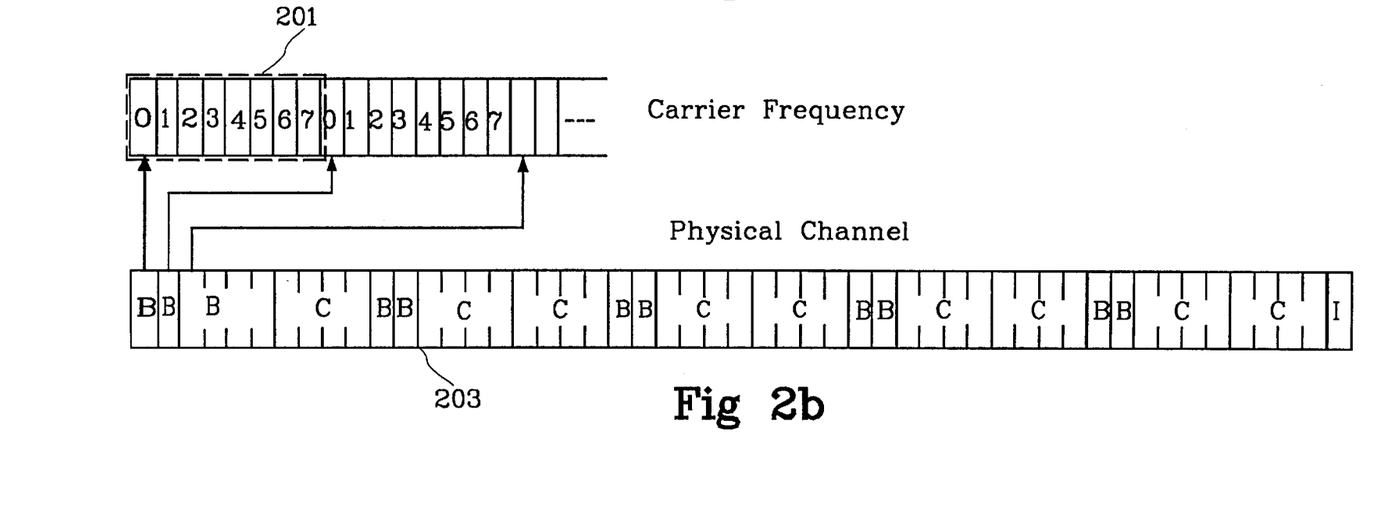
FIG. 2b is a mapping diagram of the physical downlink control channel and some logical channels in a GSM system.

FIG. 2b also shows a frequency channel having a TDMA frame 201, although this frequency channel forms a downlink channel. FIG. 2b also shows a physical channel 203 in downlink, in which channel both BCH channels and CCCH channels are transmitted. The channels are mapped in accordance with a predetermined plan. PCH channels are referenced B and CCCH channels are referenced C. The CCCH channels may be AGCH channels or PCH channels. An "empty" channel I is mapped last in an ingoing multiframe.

For the sake of simplicity, it is assumed in the following that communication is effected with the mobile station MS1 via the radio base station BTS1 and the base station controller BSC1 in FIG. 1.

Data received by the radio base station BTS1 from the base station controller 1 and forwarded to the mobile station MS1 is processed so as to enable the original data to be estimated in the mobile station MS1, despite part of this data having been lost as a result of radio transmission. Signal processing includes in downlink channel encoding, interleaving, encryption, and in uplink detection, decryption, de-interleaving and channel decoding.

The Abis interface describes the format for communication between the radio base station BTS1 and the base station controller BSC1. Messages between the radio base station BTS1 and the base station controller BSC1 and data that shall be sent between the base station controller BSC1 and the mobile station MS1 and intended to pass the radio base station BTS1 transparently are both sent over the Abis interface. When data intended for the mobile station MS1 in downlink is converted from the format on the Abis interface to the format according to the radio interface, the bandwidth of the signal is increased by virtue of further data bits carrying the information subsequent to signal processing. On the other hand, the signal bandwidth is decreased in uplink when data from the radio channel passes through the reverse signal processing procedure in order to pass the Abis interface.

Figure 3:
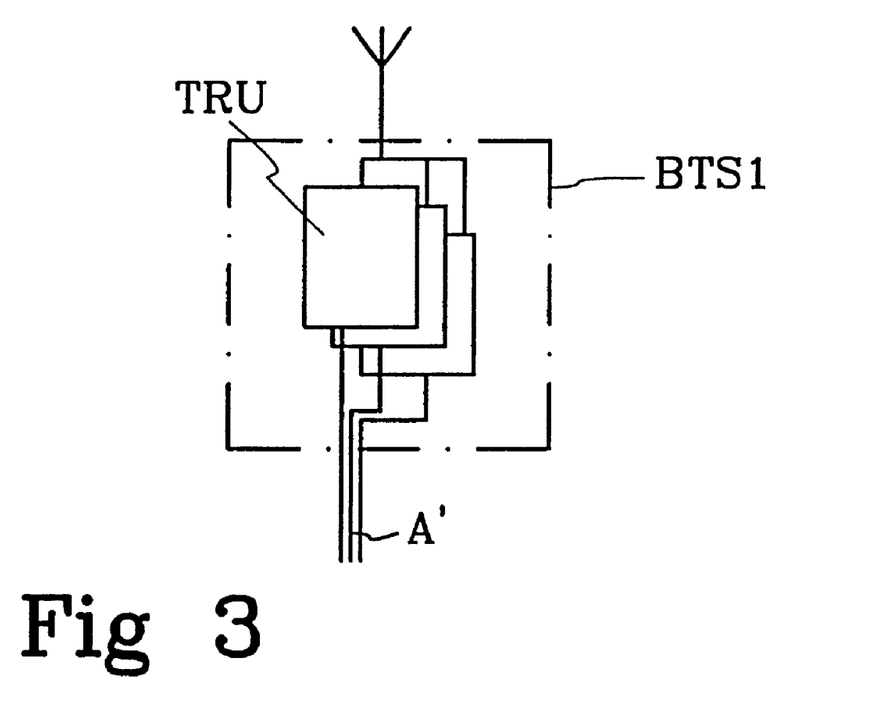
FIG. 3 is a simplified block schematic illustrating a known radio base station.

FIG. 3 is a simplified block schematic illustrating a known radio base station BTS1. The radio base station BTS1 includes an antenna and three transceiver units TRU. Each of these transceiver units TRU is connected to the antenna and to the connection A" with a base station controller BSC1–BSC2. Communication via this latter connection is effected in accordance with the described Abis interface. A transceiver unit TRU is responsible for the connection over a radio frequency channel. Thus, the transceiver unit selects in downlink from the Abis interface data what shall be transmitted via the radio frequency channel and converts said data to the radio interface format, and thereafter sends the data over the frequency channel. A transceiver unit TRU receives data in a frequency channel in the uplink and converts this data from the radio interface to the Abis interface. The transceiver then sends the data in uplink to a connected base station controller BSC1–BSC2.

The GSM standard does not disclose that the radio base station BTS1 may be provided with an array antenna for enabling an antenna lobe to be shaped and directed advantageously subsequent to having established a connection with a mobile station over a physical radio channel. However, the person skilled in this art is well aware that the radio base station BTS1 shown in FIG. 3 can be provided with an array antenna and with means in the transceiver unit TRU for generating a directional estimate of a received signal. It is also well known to provide the transceiver units TRU with means for directing the antenna lobe for each dedicated physical channel, via the array antenna. It is also well known to separately control the antenna lobe for uplink and downlink connections per se. One problem, however, is that there is no communication between the transceiver units TRU. After a connection has been moved to a new radio channel, a directional estimate generated in a first transceiver unit TRU cannot be used in a second transceiver unit that handles the new radio channel.

The background of the invention has been described in the aforegoing and a description of the actual invention will now follow. The invention resides, on the one hand, in a method that is applied in the radio base station BTS1 in the earlier given example. However, the inventive method requires modification to the above-described radio base station BTS1. A radio base station that can be used in carrying out the exemplified method will be described below.

The method comprises identifying the recognition character of the mobile station MS1 and registering the recognition character and a directional estimate generated for the mobile station MS1. When a new radio channel is opened for the mobile station MS1, the directional estimate can be found with the aid of the registered recognition character relating to the mobile station MS1. The directional estimate is then used to shape the antenna lobe in an advantageous direction, immediately use of the new channel is commenced.

Figure 4A:
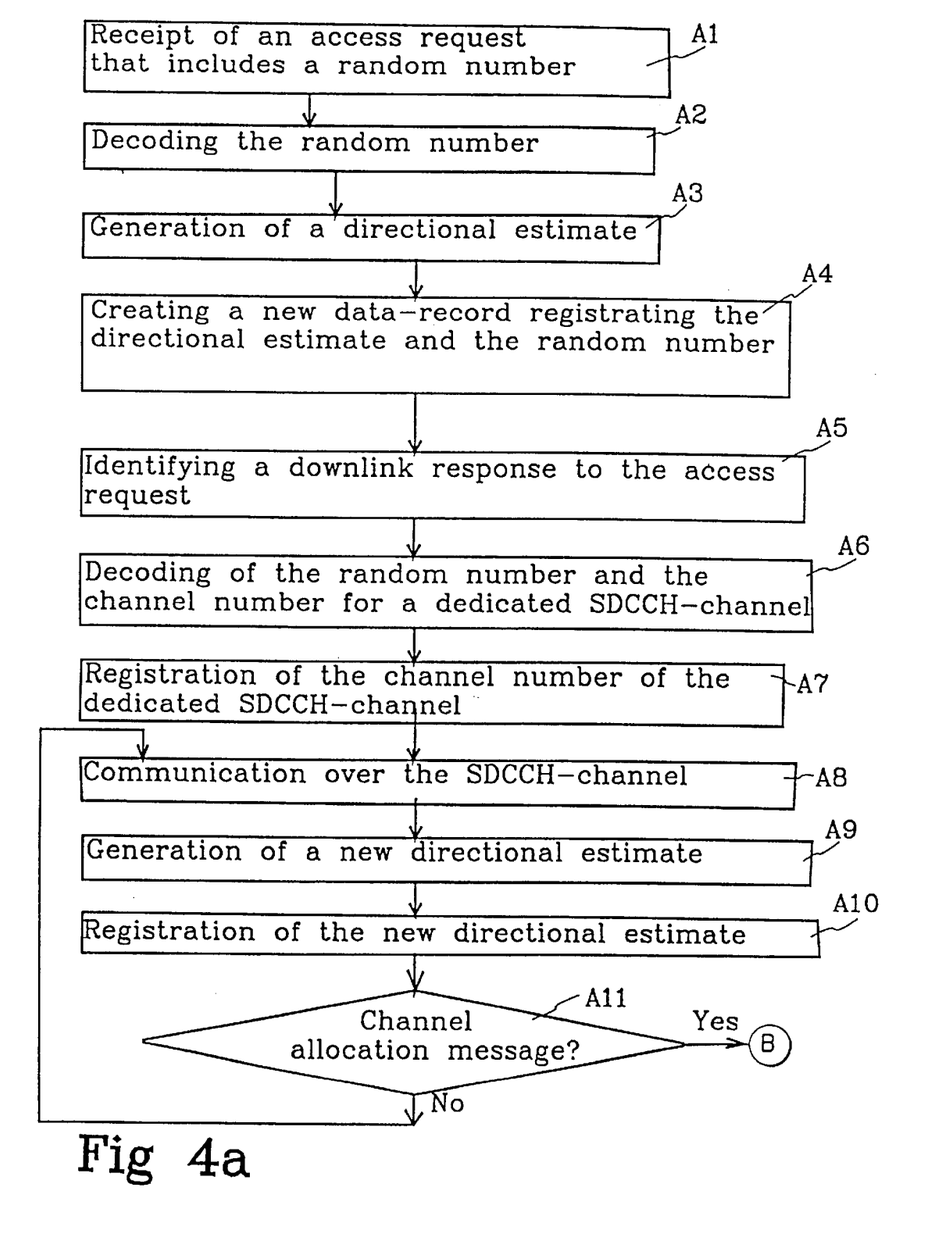
FIG. 4a is a flowsheet illustrating an inventive method of channel allocation to a radio connection.

FIG. 4a illustrates an example of how the inventive method works in conjunction with setting-up a call connection requested by the mobile station MS1 and subsequent granting of said request.

The method is commenced in response to the radio base station BTS1 receiving an access request from the mobile station MS1. The access request is received in the access channel and in a certain TDMA frame. It is assumed in this case that the access request occurs on the initiative of the mobile station. The access request includes a random number (5-bit discriminator) generated by the mobile station. This step is shown by step A1 in FIG. 4a.

In a following step, A2, the radio base station BTS1 decodes the random number. This decoded random number is a first recognition character for the mobile station MS1, wherewith the radio base station BTS1 is able to identify the mobile station MS1 as the mobile station from which the access message was received. Also identified is the TDMA frame number in which the access is received.

A directional estimate based on the access request received from the mobile station MS1 is generated in step A3.

Subsequent hereto, a new data-record is opened in a register for the mobile station MS1. This data-record includes a plurality of information fields. The directional estimate is written into one of these fields and the random number and TDMA frame number are written into another of said fields. This is shown in step A4 in FIG. 4a.

A response to the access request is identified in the downlink in a following step, A5. In GSM terminology, this response to the access request is designated "Immediate Assign". This response is intended to indicate to the mobile station MS1 the new channel that shall be used for the radio connection. The new radio channel is allocated by the base station controller.

The radio base station BTS1 decodes the random number and the new radio channel and TDMA frame number to which the response relates, in accordance with step A6. The decoded TDMA frame number is the same as the TDMA frame number in which the access signal was received in the uplink. The new physical radio channel is denoted with a channel number. In the case of the present example, the new radio channel is a logical SDCCH channel.

The coded channel number forms a further recognition character for the mobile station MS1. This recognition character is registered in an information field intended for new channel numbers in the data-record that has been setup. The correct data-record is found by referring to the random number and to the frame number which accompany the response to the access request, or Immediate Assign, together with the channel number. This is shown in step A7.

Communication then takes place over the SDCCH channel, wherein signal data for setting up a traffic connection is exchanged between the mobile station MS1 and the base station controller BS1, in accordance with step A8. When communication commences over the SDCCH channel, the channel number of said channel is moved from the field that denotes new channel numbers in the data-record setup in the register to a field that denotes ongoing channel numbers. This takes place on the initiative of the transceiver unit in the radio base station BTS1 that handles the SDCCH channel.

A directional estimate is also generated on the basis of the latest received signal sequence, see a following step A9.

The latest received directional estimate is registered in the data-record setup in the register, instead of the earlier generated directional estimate. The correct data-record is found by referring to the channel number, in accordance with step A10.

A check "Has a channel allocation message been sent in downlink?" is carried out in the following step 11.

If the answer is negative, i.e. no channel allocation message has been sent, communication continues over the channel in accordance with step A8. A new directional estimate is generated also on the basis of the latest received signal burst, in accordance with step A9, this step being followed by steps A10, A11 and so on.

Figure 4B:
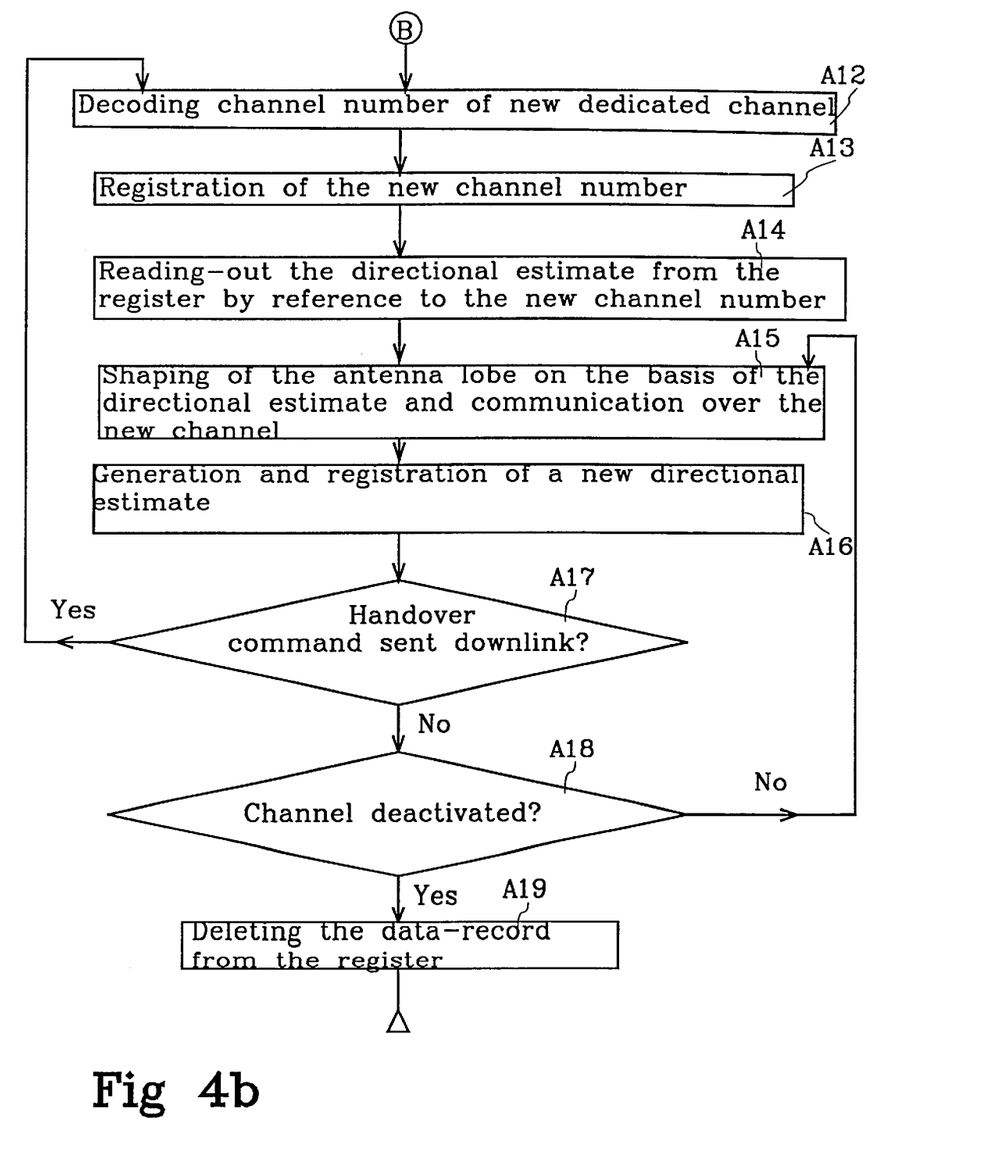

If, on the other hand, the answer to the query in step A11 is in the affirmative, Yes, a channel allocation message has been sent in the downlink, the new channel number is decoded in accordance with step A12 in FIG. 4b. The decoded channel number is registered in the information field for new channel numbers in the data-record that has been setup, in accordance with a following step A13. In this case, the allocated physical channel is a physical traffic channel.

In the present example, the allocated physical traffic channel is carried by a frequency channel different to the beacon channel and is handled by another transceiver unit. The directional estimate is read-out from the aforesaid data-record by referring to the new channel number, i.e. the channel number of the physical traffic channel. It is the new transmitter unit that reads-out the directional estimate. This is shown in step A14 in FIG. 4b.

The antenna lobe is shaped appropriately on the basis of the directional estimate immediately use of the traffic channel for communication commences, this being shown in step A15. In conjunction with commencement of the use of the traffic channel, the channel number of the physical traffic channel is transferred from the field for new channel numbers to the field for active channel numbers. This takes place on the initiative of the transceiver unit TRU that handles the physical traffic channel.

A relevant channel estimate is then generated on the basis of the latest received signal, in accordance with a step A16.

In a following step A17, a downlink control is carried out, "Have commands been sent to the mobile station concerning handover to a new channel?"

If the answer to the question in step A17 is affirmative, yes a handover command has been sent to the mobile station MS, the method returns to step A12, wherewith the new channel number accompanying the handover command is decoded. Steps A13, A14 and so on are then carried out.

If, on the other hand, the answer to the question in step A17 is negative, i.e. no handover command has been sent in the downlink, step A18 carried out.

Step A18 involves checking whether or not the radio base station BTS1 has received a command ordering deactivation of the current channel. The command is sent by the base station controller BSC1 to the radio base station BTS1 when the connection with the mobile station MS1 has already been moved to a new channel, or when the connection has been released. The radio base station BTS1 is unable to check which of these reasons applies.

If the answer to the query in step A18 is negative, no command ordering deactivation of the channel has been received, communication continues over the channel in accordance with step A15, followed by steps A16, A17 and so on.

If, on the other hand, the reply to the query in step A18 is affirmative, a channel deactivation order has been received, an attempt is made to erase the data-record established in the register in accordance with step A19. This is achieved by attempting to find the data-record in the register, by referring to the channel number of the channel to be deactivated. If the data-record is found, the record is erased. The data-record can only be found when the reason for said deactivation is because the connection with the mobile station shall be released. Otherwise, the deactivation command will have been preceded by a handover command and the channel number of the channel to be deactivated will have been replaced with the new channel number in the data-record field for active channel numbers.

In the aforedescribed procedure, the directional estimate is already registered when the mobile station MS1 makes its first access over the access channel. However, the directional estimate is not used to shape the antenna lobe until communication takes place over the traffic channel in accordance with step A16. This is because it is assumed in the described method of procedure that the SDCCH channel is transmitted by the beacon channel. A multiple of mobile stations MS1–MS3 measure the level of output power from the beacon channel downlink. Consequently, transmission downlink in the beacon channel is not power regulated and neither is it possible to aim the antenna lobe when transmitting via the beacon channel. On the other hand, the antenna lobe can be shaped in the uplink also when receiving on the beacon channel. The flowsheet presented in FIG. 4a is supplemented after step A7 with a new step corresponding to steps A14 in which the directional estimate is read, and the following step A8 concerning communication over the SDCCH channel is supplemented with directing the antenna lobe in uplink.

The SDCCH channel may also be transmitted over a frequency channel other than the beacon channel. In this case, the antenna lobe can be shaped in both downlink and uplink. In this regard, the flowsheet is supplemented in the aforedescribed manner, although the antenna lobe is directed in both uplink and downlink in step A8.

The call connection can be setup in the GSM system in other ways than the way shown in FIGS. 4a and 4b. When the connection is setup on the initiative of the mobile station MS1, as in the illustrated case, the base station controller BSC 1 is able to allocate a physical traffic channel directly instead of a SDCCH channel. A directional estimate based on the access message from the mobile station MS1 can then be read by the transceiver unit that handles the physical traffic channel and used to shape the antenna lobe appropriately in both uplink and downlink. One prerequisite is that the physical traffic channel does not use the beacon channel.

It is also possible that the access initiative arrives from the mobile network MSC, BSC1. The mobile station MS1 will, also in this case, send access signals that contain a random number over the access channel. This enables a first directional estimate to be generated on the basis of this access signal, as shown in FIG. 4a. The directional estimate can also be found with the aid of the first random number and, later, with the aid of the allocated channel number.

Reading of the new channel number in step A14 takes place immediately prior to transferring the radio connection to the new channel. The radio base station BTS1 then receives a command from the base station controller BSC1 to activate the channel concerned. The base station controller BSC1 does not inform the radio base station BTS1 that the mobile station MS1 will use the channel. However, the directional estimate associated with the mobile station MS1 can be read by referring to the channel number of the new channel, which is known to the radio base station BTS1.

In step A17, a check is made to ascertain whether or not a new channel handover command has been sent in the downlink. If the answer is yes, a handover command has been sent in downlink, the channel number of the new channel is decoded and registered. The transceiver unit TRU which thereafter handles the new channel is able to read the register and use the directional estimate for the new channel.

There are two ways in which handover to a new channel can take place. The first of these is intracell handover, i.e. the new channel is located within the radio base station BTS1. In this case, the transceiver unit TRU that handles the new channel reads the register and finds the directional estimate, which can be used directly to shape the antenna lobe.

The other case is an intercell handover, i.e. the new channel is located in a radio base station BTS2–BTS6 other than the radio base station BTS1. The directional estimate cannot be used directly in this case. The direction-of-arrival from the new radio base station BTS2–BTS6 to the mobile station is, after all, different to the direction-of-arrival indicated by the directional estimate. However, the direction to the mobile station MS1 from the new radio base station BTS2–BTS6 can be calculated with the aid of a positioning system. A multiple of positioning stations are described in the literature, in patent specifications among other documents. A group of such systems calculate the position of a mobile station on the basis of the direction to a mobile station MS1–MS6 from a radio base station BTS1–BTS6 and the distance from said base station.

In the present case, the inventive method is carried out in the radio base station BTS1. This has the advantage of not needing to change the Abis interface when the directional estimate is used only in channel changes within the radio base station BTS1.

However, the inventive method can also be applied in another node, e.g. in the base station controller BSC1, although the new messages between the radio base station and the base station controller BS1 must then be delivered to the Abis interface. It is also necessary to change the Abis interface when the directional estimate is to be used in handover between radio base stations BTS1–BTS6.

The directional estimate and a number of mobile station recognition characters are registered in the method according to FIGS. 4a and 4b. The first known and registered recognition character is the random number together with a frame number, whereafter new channel numbers and active channel numbers are registered as said numbers become known.

It is also suitable to register the identity of the access channel together with the random number and the TDMA frame number. When more than one access channel is available in the radio base station BTS1, the access channel identity also constitutes a recognition character when used together with the random number. The access channel has a corresponding dedicated channel in the downlink, and hence the recognition character of the access channel identity can also be identified in downlink. The access channel identity is therefore registered together with the random number in the information field intended for the random number and the TDMA frame number.

Figure 5:
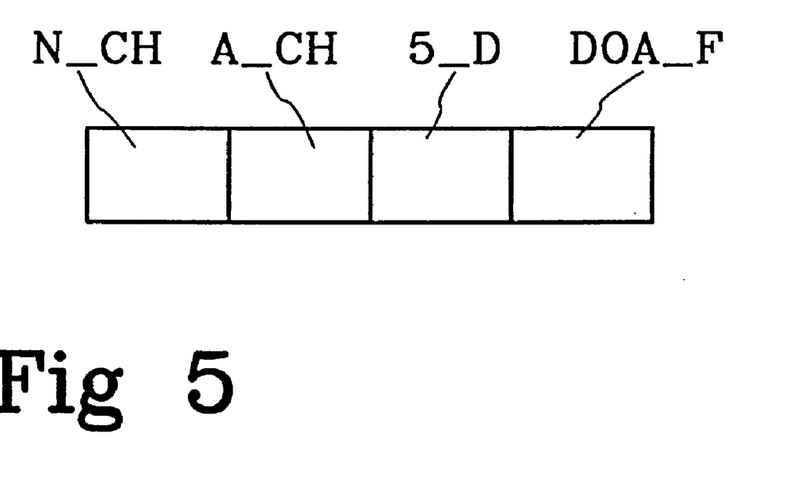
FIG. 5 illustrates the format of a data-record in a register.

In the method according to FIGS. 4a and 4b, a new data-record is setup for the mobile station MS1, when an access message is received from the mobile station MS1 and still no data-record has been setup. It is also possible to setup a new data-record for the mobile station MS1, when handover is made to the radio base station BTS1. FIG. 5 shows the principle of data-record registration. A setup data-record will include an information field DOA_F in which the directional estimate is registered, another field 5_D in which the random number, TDMA frame number and also possibly the access channel identity are registered, a field N_CH intended for a new channel number, and a field A_CH intended for the channel number of an active channel. Those fields in which no information is registered when setting up the data-record are zeroed. The recognition characters are registered in these fields, whereafter the characters become known as exemplified in the method illustrated in FIGS. 4a and 4b.

The correct data-record, in this case the data-record of the mobile station MS1, can be found and the directional estimate read-out, by referring to one of the registered recognition characters.

Figure 6:
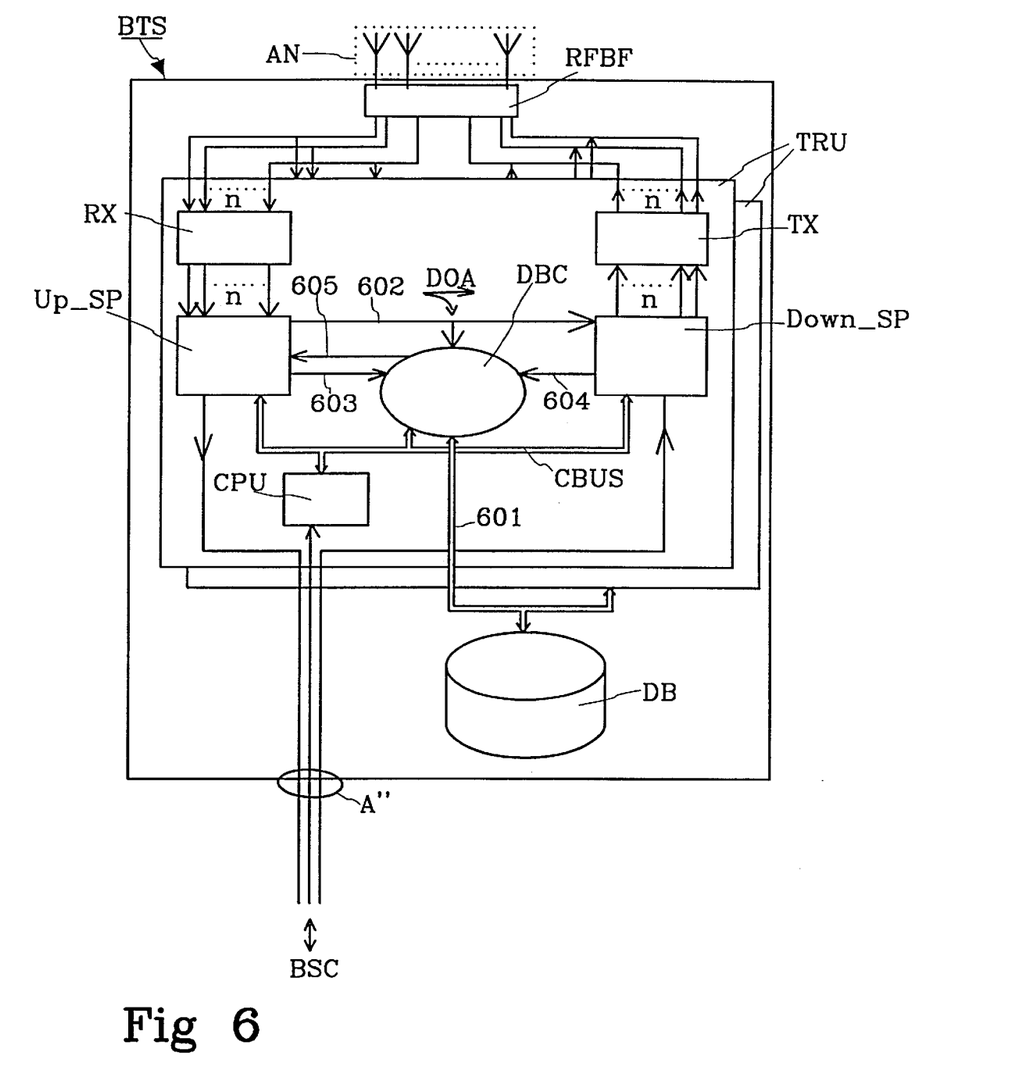
FIG. 6 is a block schematic illustrating an inventive radio base station.

FIG. 6 shows an example of an inventive radio base station BTS in the GSM system. As with earlier known radio base stations, the radio base station BTS is equipped with an array antenna AN which includes a number n of antenna elements, a lobe-shaping unit RFBF on RF level in direct connection with the antenna, two transceiver units TRU, and a connection A" according to the Abis interface and the base station controller BSC. The connection A" connects to each transceiver unit TRU. The junction to this A"-connection is hereinafter called the Abis interface. The radio base station is also equipped with a novel database DB.

Each transceiver unit TRU is provided with a downlink branch, an uplink branch and a central processor in a known manner.

The downlink branch includes a signal processing part Down_SP and a radio transmitter TX which is connected to the array antenna. The signal processing part Down_SP is connected to the Abis interface. The radio transmitter TX is connected to the signal processing part Down_SP and to the array antenna AN via the lobe-shaping unit RFBF.

The uplink branch includes a radio receiver RX and a signal processing part Up_SP. The radio receiver RX is connected to the array antenna AN via the lobe-shaping unit RFBF. The radio receiver RX is also connected to the signal processing part Up_SP. The signal processing part Up_SP is connected to the Abis interface.

A transceiver unit TRU also includes a central processor CPU and a database processor DBC which handles communication between the transceiver unit TRU and the database DB. A database bus 601 connects both database processors DBC of the receiver unit TRU to the database DB.

The central processor CPU is connected to the Abis interface and, via a control bus CBUS, to both signal processing parts Up_SP, Down_SP of the uplink and downlink and to the database processor DBC in each transceiver unit TRU. The central processor CPU handles communication of the radio base station BTS with the base station controller BSC and reads the messages to the own transceiver unit TRU from the Abis interface, and sends the messages to the base station controller in the opposite direction. The central processor CPU controls the uplink branch and the downlink branch in the two transceiver units TRU with the aid of control data from the base station controller.

In the uplink branch, the radio receiver RX is connected to the array antenna AN through a number n of connections, via the lobe-shaping unit RFBF. The radio receiver selects a frequency channel from the array antenna AN, demodulates the radio signal in the channel, and mixes down the signal from radio frequency to baseband and samples the signal. The sample signal is applied to the signal processing part Up_SP. The radio receiver RX implements this procedure for each of the n-number of connections from the array antenna AN. Each of the connections corresponds to an antenna lobe. The signal processing part Up_SP includes means for generating a directional estimate DOA on the basis of the signals received from each of the n-number of connections. A signal is then selected from the best antenna lobe in the signal processing part Up_SP. The signal processing part Up_SP also includes means for thereafter implementing the earlier described decoding procedure for adapting signal information to the Abis interface instead of to the radio interface, and also means for forwarding the process data to the base station controller BSC.

The signal processing part Down_SP of the downlink is provided with means for selecting from the Abis interface in the downlink data that is intended for the frequency channel handled by the downlink branch. This data selection is controlled from the central processor CPU. The signal processing part Down_SP also includes means for adapting the selected data flow to the radio interface instead of the Abis interface. The manner in which the data is processed has been described above.

The connecting radio transmitter RX receives the data from the signal processing part Down_SP and D/A, converts the data and then modulates and amplifies the data, and finally transmits the data through the air via the array antenna AN.

The radio transmitter RX has n-number of connections to the lobe-shaping unit RFBF that connects with the array antenna AN. Each of these n-number of connections corresponds to an antenna lobe. The radio transmitter RX is provided with a switch and means for coupling the transmitted data to a given antenna lobe, this antenna lobe being indicated by a control signal from the downlink signal processor.

The signal processing part Up_SP of the uplink includes a connection 602 via which a directional estimate DOA can be sent to the downlink signal processing part Down_SP. The directional estimate DOA is used to designate an antenna lobe. The signal processing part Down_SP controls transmission to the designated antenna lobe via the control signal to the radio transmitter TX.

The most recently generated directional estimate DOA, i.e. the latest estimate, is also sent to the database processor DBC from the signal processor Up_SP of the uplink, via the connection 602. Information as to the channel in which the directional estimate is generated is also set together with the directional estimate DOA. If the directional estimate has been generated in the access channel, the TDMA frame number of the signal on which the estimate is based is also included. The directional estimate DOA is then registered in the database DB by the database processor DBC.

If the directional estimate DOA is based on an access signal, the database processor DBC also needs to know the random number that constitutes a first mobile station recognition character, in order to setup a data-record in the database. The signal processing part Up_SP of the uplink has a connection 603 to the database processor DBC. The messages in control channels uplink are copied and the copies sent to the database processor DBC. The database processor identifies the messages that contain a mobile station recognition character and then decodes the recognition character. One such message is the access request and the recognition character is the random number.

The identity of the channel in which the received message is transmitted is sent together with the copied message. The TDMA frame number of the message is also included, when the transmitted channel is the access channel.

The database processor includes means for combining a directional estimate and a random number that both derive from the same access signal, with the aid of the signal TDMA frame number. The directional estimate is then registered in the database DB, together with the random number and the TDMA frame number.

The signal processing part Down_SP of the downlink also includes a connection 604 to the database processor DBC. A message in one of the control channels downlink is copied in the signal processing part Down_SP and sent to the database processor DBC, via the link 604. The database processor DBC identifies the message that contains a mobile station recognition character and decodes said character. One such message is the channel allocation message and the recognition character is the allocated or dedicated channel. As with the message obtained in the uplink, the identity of the channel to which the message belongs is also given.

A downlink message that is identified by the database processor DBC is the response to the access request. This response contains two recognition characters. The first character is the random number and the TDMA frame number, and the second character is the channel number of the dedicated channel. The correct data-record is found in the database DB with the aid of the first recognition character, and the channel number of the dedicated channel is registered.

A further connection 605 is provided with the database processor DBC to the signal processing block Up_SP of the uplink. A directional estimate DOA is sent from the database processor DBC to the signal processing block Up_SP via this connection 605. This is implemented in conjunction with taking a new channel into use for the connection with the mobile station. The central processor CPU requests the database processor DBC to deliver the directional estimate DOA for a given new channel. The database processor DBC finds the correct data-record in the database, by referring to the new channel number, and reads the directional estimate DOA. The database processor DBC sends the directional estimate DOA to the signal processing part Up_SP, from where the estimate is also sent to the signal processing part Down_SP of the downlink. The directional estimate in both the signal processing part Up_SP of the uplink and the signal processing part Down_SP of the downlink is used to allocate a suitable antenna lobe.

The radio base station BTS illustrated in FIG. 6 can only read and register directional estimates that have been generated in the own radio base station. In the case of intercell handover, it is desirable to use a directional estimate that has been generated in a base station other than the target base station. It is possible to receive directional estimates in the radio base station and register and use the received directional estimate in the radio base station, by connecting the database processor DBC to the Abis interface A". It is also possible to send a directional estimate to the base station controller BSC. However, in order to transmit between the radio base station and the base station controller BSC, it is necessary to modify the Abis interface so that new messages can be transmitted. As described above, it is necessary to reform the directional estimate in order for it to be used in a radio base station other than that in which the estimate was generated. It has been assumed in the above description of the radio base station BTS that lobe-shaping is implemented on an RF level in the lobe-shaping unit RFBF. It has also been assumed that there are a number of fixed antenna lobes to choose from. However, several methods are known for controlling an array antenna. For instance, it is known to control the array antenna for lobe-shaping on a baseband level. This can be implemented in the respective signal processing part Up_SP, Down_SP of the uplink and downlink, in the base station BTS. A connection shall be found between each of the antenna elements of the array antenna AN and the radio transmitter TX and the radio receiver RX respectively. Further connections corresponding to each antenna element lead to the signal processing part Up_SP and Down_SP of respective uplink and downlink.

However, the present invention can be applied with all known antenna lobe-shaping principles.

The GSM system includes a number of different options for allocating a dedicated channel. As before described, a channel can be allocated by allocating a chosen time slot on a given frequency channel to constitute the dedicated physical channel. The dedicated channel may also conceivably be a half-rate channel, i.e. a physical channel that is divided into two parts, so that each alternate time slot will pass to one user and each other time slot will pass to another user. It is also possible to allocate a dedicated physical channel that constantly changes frequency, so-called frequency hopping.

By channel number as used in this document is meant parameters that point-out an allocated physical channel unequivocally. Accordingly, another word that can be used instead of channel number is channel identity. The information necessary to indicate channel identity will depend on the manner in which the channel is formed.

It has been assumed in the aforedescribed example that only one physical channel at a time can be used for communication with the mobile station MS1. However, it is conceivable to use more than one physical channel. It is also possible either to use several physical channels simultaneously or to implement communication over one of a smaller number of channels and quickly switch between channels. In this case, the data-record that is setup, shown in FIG. 5, is provided with further information fields. All channels that are used for this communication will include an information field. Depending on how these channels are allocated, it may be appropriate for each channel to include a field that is used before the channel is taken into use and a further field that is used when the channel is used.

The aforedescribed embodiments are only examples of how the invention can be applied in a GSM system. However, a directional estimate that has been generated in a first channel can be used to shape an antenna lobe in another channel in other radio communications systems. The division of channels varies between different types of radio channels, although the invention can be applied equally as well in systems in which the frequency spectrum is divided on the basis of TDMA, FDMA, CDMA or OFDM (Orthogonal Frequency Division Multiplexing). The logical channel division varies from system to system, and consequently the channel examples described above must be adapted to the radio system in which the invention is applied. The terminal recognition characters sent over the radio connection between different radio communications systems also vary. One type of recognition character used in all known radio communications systems is the identity of the terminal within the system. Each terminal must have a unique identity in order to be able to couple a call connection to the right terminal. This identity can be used with the present invention when the identity is changed in conjunction with channel changes. The identity can then be used to read the correct directional estimate in a register in which the identity has earlier been registered in conjunction with the directional estimate.

The invention can also be applied in a telephone network in which the line in the subscriber stage is a radio in the local loop RLL connection. In this case, the terminal, i.e. the telephone, is always located in one and the same place. The number of radio channels in an ingoing radio base station is normally fewer than the number of telephones that depend on the radio base station for teleconnection. The radio channel that is allocated to a given telephone will therefore vary between different calls. However, the direction to the telephone will remain the same. Consequently, a directional estimate that has been registered for an earlier call can be used to direct the antenna lobe in respect of the new call connection, immediately the telephone has been identified.

What is claimed is:

1. A method pertaining to a radio communications system which includes at least one base station controller and at least one radio base station which establishes radio communication with at least one terminal and which only passes signaling information between the at least one terminal and the base station controller, and the at least one radio base station having antenna lobes that can be directed towards the one terminal, and said base station controller switching system communication by the at least one terminal from a first to a second radio channel, said method performed by the radio base station comprising the steps of:
   a) receiving, over said first radio channel, signals that have a given direction-of-arrival from the one terminal;
   b) estimating the direction-of-arrival of the received signals such as to obtain a directional estimate;
   c) identifying a terminal recognition character;
   d) registering the terminal recognition character and said directional estimate in a storage device;
   e) identifying said second radio channel, which is allocated by said base station controller, for communication with the one terminal;
   f) reading-out said directional estimate from the storage device;
   g) directing the antenna lobe for the second radio channel in accordance with said directional estimate which is read out; and
   h) communicating with the one terminal over said second radio channel.

2. A method according to claim 1, wherein identification of the terminal recognition character in accordance with step c) is implemented by decoding an access message sent by the one terminal.

3. A method according to claim 2, wherein the one recognition character is a random number.

4. A method according to claim 1, wherein identification of the terminal recognition character in accordance with step c) is implemented by decoding a channel allocation message in downlink.

5. A method according to claim 4, wherein the terminal recognition character includes an identity of a new allotted channel.

6. A method according to claim 1, wherein the terminal recognition character according to step c) includes an identity of the first radio channel.

7. A method according to claim 1, wherein identification of said second radio channel in accordance with step e) is implemented by receiving a channel activation command that contains channel identity.

8. A method according to claim 1, wherein reading of the directional estimate in accordance with step f) is implemented by reference to said terminal recognition character.

9. A method according to claim 1, wherein the first and the second radio channels are logical channels.

10. A method according to claim 1, wherein the first and the second radio channels are physical channels.

11. A method according to claim 1, further comprising the step of applying the method to a GSM system.

12. A method pertaining to a radio communications system which includes at least one base station controller and at least one radio base station that can establish radio communication with at least one terminal and that only passes signaling information between the one terminal and the base station controller, and the radio base station having antenna lobes that can be directed towards the terminal, and the base station controller switching system communication by the one terminal from a first to a second radio channel, said method performed by the radio base station comprising the steps of:
   a) receiving, over said first radio channel, signals that have a given direction-of-arrival from the terminal;
   b) estimating the direction-of-arrival such as to obtain a directional estimate;
   c) identifying a mobile station recognition character;
   d) registering the recognition character and said directional estimate;
   e) identifying said second radio channel, which is allocated by the base station controller, for communication with the terminal;
   f) reading-out said directional estimate;
   g) directing one of the antenna lobes for the second radio channel in accordance with said directional estimate; and
   h) communicating with the channel over said second radio channel wherein identification of said second radio channel in accordance with step e) is implemented in conjunction with receiving from the terminal a new access signal that contains the mobile station recognition character.

13. A radio base station having a first connection to a communications network which has at least one of a plurality of terminals placed at its disposal upon request, said radio base station only passing information between the communications network and the plurality of terminals, said radio base station comprising:
   at least one array antenna;
   at least one transceiver unit which connects with the array antenna and which includes
      a) an uplink branch having means for selecting at least one desired radio channel of the array antenna, means for detecting data received in the selected radio channel, means for forwarding the detected data from the selected radio channel over the first connection, and means for generating a directional estimate from data received in the selected radio channel, and
      b) a downlink branch having means that receives a bit stream from the first connection, and means for modulating and amplifying said bit stream and for transmitting said bit stream in a radio channel allocated by the communications network via said array antenna;

means in connection with the uplink branch for identifying a mobile station recognition character in the detected data of the uplink branch;

means in connection with the downlink branch for identifying a mobile station recognition character from the bit stream of the downlink branch;

means for linking an obtained directional estimate with said recognition character; and a database connected to the transceiver unit;

wherein said directional estimate and said recognition character being registered in the data base and read-out therefrom and wherein the uplink branch and downlink branch direct the antenna lobe based upon the direction estimate read-out from the database.

14. A radio base station according to claim 13, wherein the first connection also connects with the database for registering directional estimate and recognition character and for reading-out said directional estimate and said recognition character.

15. A radio base station according to claim 13, wherein the transceiver unit includes a database processor having connections to the uplink branch, the downlink branch and the database, wherein the database processor identifies the mobile station recognition character and obtains said directional estimate from the uplink branch and registers said recognition character and said directional estimate in the database, wherewith the database processor reads-out said recognition character and said directional estimate from the database and informs the uplink branch.

16. A radio base station according to claim 13, wherein the transceiver unit includes a connection between the uplink branch and the downlink branch over which the directional estimate is transmitted.

17. A radio base station according to claim 13 wherein the uplink branch and the downlink branch are each provided with means for directing the antenna lobe in uplink and downlink respectively.

18. A radio base station according to claim 13 wherein the radio base station is connected directly to a base station controller in a GSM system.

19. A radio base station having a first connection to a communications network which has at least one of a plurality of terminals placed at its disposal upon request, said radio base station only passing information between the plurality of terminals and the communications network, said radio base station comprising:

at least one array antenna;

at least one transceiver unit which connects with the array antenna and which includes
  a) an uplink branch having means for selecting at least one desired radio channel of the array antenna, means for detecting data received in the selected radio channel, means for forwarding the detected data from the selected radio channel over the first connection, and means for generating a directional estimate from data received in the selected radio channel, and
  b) a downlink branch having means that receives a bit stream from the first connection, and means for modulating and amplifying said bit stream and for transmitting said bit stream in a radio channel via said array antenna, wherewith the uplink branch and the downlink branch are adapted to direct the antenna lobe on the basis of a given directional estimate;

means in connection with the uplink branch for identifying a mobile station recognition character in the detected data of the uplink branch;

means in connection with the downlink branch for identifying a mobile station recognition character from the bit stream of the downlink branch;

means for linking an obtained directional estimate with said recognition character; and a database connected to the transceiver unit;

said directional estimate and said terminal recognition character being registered in the data base and read-out therefrom, wherein the communications network designates the radio channel that shall be used for radio connection with the mobile station, and wherein no message is sent to the radio base station as to which mobile station uses a given channel.

* * * * *